(12) United States Patent
Pacheco Parra (10) Patent No.: US 12,545,096 B2
(45) Date of Patent: Feb. 10, 2026

(54) SYSTEM AND METHOD FOR CONVERTING A MECHANISM ACTUATED BY INTERNAL COMBUSTION INTO A HYBRID MECHANISM

(71) Applicant: MOVENER SPA, Santiago (CL)

(72) Inventor: Gonzalo Andres Pacheco Parra, Santiago (CL)

(73) Assignee: Movener SpA (CL)

( * ) Notice: Subject to any disclaimer, the term of this patent is extended or adjusted under 35 U.S.C. 154(b) by 406 days.

(21) Appl. No.: 18/040,822

(22) PCT Filed: Aug. 10, 2021

(86) PCT No.: PCT/IB2021/057389
§ 371 (c)(1),
(2) Date: Feb. 7, 2023

(87) PCT Pub. No.: WO2022/034508
PCT Pub. Date: Feb. 17, 2022

(65) Prior Publication Data
US 2023/0294502 A1 Sep. 21, 2023

(30) Foreign Application Priority Data
Aug. 12, 2020 (CL) .................................. 2085-2020

(51) Int. Cl.
*B60K 6/36* (2007.10)
*B60K 6/40* (2007.10)
(Continued)

(52) U.S. Cl.
CPC .................. *B60K 6/36* (2013.01); *B60K 6/40* (2013.01); *B60W 20/40* (2013.01); *F01N 5/025* (2013.01)

(58) Field of Classification Search
CPC ............... B60K 6/36; B60K 6/40; B60K 6/50
See application file for complete search history.

(56) References Cited

U.S. PATENT DOCUMENTS 7,271,555 B1 9/2007 Ciccone
7,343,993 B2 3/2008 Dong
(Continued)

FOREIGN PATENT DOCUMENTS

ES 2269583 T3 4/2007

*Primary Examiner* — Jeffrey J Restifo
(74) *Attorney, Agent, or Firm* — Patenting Consulting Group; Roberto J Rios (57) ABSTRACT

Disclosed is a system for converting mechanisms actuated by internal combustion into hybrid mechanisms, and a method for implementing the system. The system comprises: a structure for supporting and positioning an electric motor, which comprises means for setting and controlling a position of the electric motor in an area near or adjacent to the transmission shaft of an internal combustion engine; transmission means that allow power to be transmitted between the electric motor and the transmission shaft of the internal combustion engine; and securing means press-fixed to the transmission shaft of the internal combustion engine, which comprise two high-pressure supports coupled together by attachment means and which encapsulate the transmission shaft at high pressure, wherein the securing means also comprise a power transmission element attached to the high-pressure supports and which is connected to the transmission means.

35 Claims, 7 Drawing Sheets

(51) Int. Cl.
*B60W 20/40* (2016.01)
*F01N 5/02* (2006.01)

(56) References Cited

U.S. PATENT DOCUMENTS

| | | | |
|---|---|---|---|
| 7,681,676 B2 * | 3/2010 | Kydd | B60K 6/48 |
| | | | 180/65.21 |
| 7,753,010 B2 * | 7/2010 | Rutledge | B60L 7/12 |
| | | | 123/3 |
| 8,217,620 B2 * | 7/2012 | Hanssen | B60K 6/48 |
| | | | 320/104 |
| 8,596,391 B2 | 12/2013 | Kshatriya et al. | |
| 9,944,271 B2 * | 4/2018 | Pandit | B60W 20/14 |
| 11,332,000 B2 * | 5/2022 | Gurski | B60K 6/46 |
| 12,269,454 B1 * | 4/2025 | Heath | B60W 30/18127 |
| 2007/0169970 A1 | 7/2007 | Kydd | |
| 2007/0175681 A1 | 8/2007 | King | |
| 2008/0236910 A1 * | 10/2008 | Kejha | B60W 30/18145 |
| | | | 180/265 |
| 2009/0127008 A1 * | 5/2009 | Batdorf | B60K 6/48 |
| | | | 29/401.1 |
| 2010/0044129 A1 | 2/2010 | Kyle | |
| 2011/0320078 A1 | 12/2011 | Mcgill | |
| 2018/0015817 A1 | 1/2018 | Samie et al. | |
| 2024/0116351 A1 * | 4/2024 | Gurski | B60K 1/04 |
| 2025/0144993 A1 * | 5/2025 | Harris | B60K 6/387 |

\* cited by examiner

SYSTEM AND METHOD FOR CONVERTING A MECHANISM ACTUATED BY INTERNAL COMBUSTION INTO A HYBRID MECHANISM

The present invention relates to technologies for the adaptation of systems actuated by internal combustion engines in hybrid or electric systems. In particular, the present invention consists of a system and a method that allows mechanisms actuated by internal combustion to be converted into a hybrid system.

BACKGROUND

At present, enormous efforts are carried out worldwide, either in the form of public policies or through economic incentives, which are aimed at promoting a transition from systems actuated by fossil fuels to electrical systems. A significant step during this transition is the use of hybrid technologies, where combustion systems and electrical systems can coexist simultaneously, either operating in series or in parallel.

The use of these technologies brings multiple benefits in economic and environmental terms, such as the reduction in the consumption of fossil fuels, polluting gas emissions, heat emission and particulate emissions. In addition, there are advantages in terms of efficiency in energy consumption, maintenance costs, or the reduction in noise associated with the operation of combustion machines.

However, at present the use of systems actuated by internal combustion engines is widely extended, being a representative case the use of diesel, gasoline or other vehicles from fossil fuels. The incentives aimed at replacing conventional vehicles with new hybrid or electric vehicles raise the possibility that in the medium term millions of vehicles will become obsolete. As a consequence, there is a need to search for technologies that can modify existing vehicles, such that it is possible to reuse the same vehicles in a more efficient way, through systems that allow the conversion of combustion systems into hybrid systems.

Different technologies have been developed for the conversion of a combustion-based system to a hybrid system, mainly aimed at the automotive industry. An example of the above is described in U.S. Pat. No. 8,596,391 B2, which discloses a method for converting a vehicle having an internal combustion engine, a transmission, an alternator and a battery into a hybrid vehicle. The method comprises installing an electric motor in the vehicle for the purpose of assisting the internal combustion engine in actuating the crankshaft of the internal combustion engine, installing an energy storage element configured to provide power to the electric motor, and installing a control unit configured to control the amount of power supplied from the energy storage element to the electric motor. For the operative installation of the electric motor and other elements, the components of the internal combustion engine must be intervened, replacing an existing pulley on a crankshaft of the internal combustion engine with a new pulley configured to receive a first belt that extends between the new pulley and an alternator pulley and a second belt that runs between the new pulley and an electric motor pulley.

Another representative document of the existing solutions in the state of the art is described in document US 2011/0320078 A1, which details a system that allows a combustible fuel vehicle to be adapted to form a plug-in electric hybrid vehicle. An electric motor/generator unit has an electric motor mode and an electric generator mode and can switch between modes in response to a signal. In this document, the alternator of a vehicle is replaced by the electric motor, and this is operatively connected to the internal combustion engine by means of pulleys, through an interconnection with the transmission train of the vehicle. A rechargeable battery is connected to the motor/generator to provide electric power to the motor/generator in motor mode and to receive electric power from the generator/motor in generator mode.

However, as can be seen from the previously described technologies, prior art solutions show complex systems, which require the intervention of multiple parts of the vehicle's machinery to carry out the adaptation of one system to another, such as replacing the vehicle's alternator with an electric motor, or by replacing existing transmission systems to install electrical system components. In general, these types of systems are usually made up of a considerable number of elements that must be operationally coupled and connected, all of which results in a large amount of time to carry out the installation and high costs associated with this operation. In addition, these technologies are exclusively aimed at intervening the crankshaft of the vehicle, leaving out the possibility of coupling to a universal joint or another shaft, and without including the possibility of applying hybrid systems in other types of machines, such as cooling systems or others.

This is fundamentally due to the fact that the systems known from the prior art have not focused so far on optimizing the adaptation process between a combustion system and a hybrid system, due to which the reduction in times associated with the adaptation of one system to another does not appear as a priority in the development of their technologies. As a consequence, existing technologies are based on configurations that often require the intervention of multiple parts and mechanisms of the vehicle, all in order to operatively couple the components of the electric system.

In view of the above, it can be seen that there is a need in the prior art to have systems and processes for the adaptation of internal combustion systems in hybrid systems, which allow optimization in the process of coupling and connection of the elements thereof, in order to allow a quick and simple adaptation from one system to another.

BRIEF DESCRIPTION OF THE INVENTION

In order to correct the aforementioned deficiencies, a system is presented for the conversion of vehicles, machines, refrigeration systems or others that are actuated by an internal combustion engine, into a hybrid system actuated by an electric motor. In its preferred configuration, the system comprises:

a structure for supporting and positioning an electric motor, which comprises means for setting and controlling a position of the electric motor in an area adjacent to the transmission shaft of the internal combustion engine;

transmission means that allow the transmission of power between the electric motor and the transmission shaft of the internal combustion engine; and securing means press-fixed to the transmission shaft of the internal combustion engine, which comprise two high-pressure supports coupled together by attachment means and which encapsulate the transmission shaft under pressure;

wherein the securing means also comprise a power transmission element attached to the high-pressure supports and which is connected to the transmission means.

In this way, the system of the present invention is specially designed to allow a simple and fast adaptation of internal combustion systems in hybrid systems, since its components are coupled to the internal combustion system without having to intervene or replace parts or elements of the original system. Thus, the installation of the elements of the system of the present invention allows an optimization in the process of coupling and/or uncoupling its elements, in order to allow a quick and simple assembly and disassembly between one system and another.

Compared to the prior art, this constitutes a substantial advantage, since in practice it provides a considerably simpler adaptation process, which incurs fewer difficulties in technical terms, lower monetary costs and, fundamentally, allows a transition from one system to another in a considerably less amount of time. This is related to the "plug & play" concept, which refers to the possibility that a user has the possibility of converting any type of system actuated by internal combustion into a hybrid system in a minimum amount of time, thus allowing access to hybrid systems to a large number of users in an economical, quick and simple manner. Likewise, by means of the described system it is possible to disassemble its components when required in a simple and quick manner.

The system of the present invention can be used in vehicles of all types, machines, refrigeration systems or others, provided that they are based on the use of internal combustion engines, allowing the combined use of said system with an electric motor system.

In addition, in various configurations of the invention, the electric motor can alternately operate in a power transmission mode and in a regenerative mode, thus allowing power to be supplied to the transmission shaft when required or operated as a regenerative system in which the system can generate power, for example, in case the system is applied in vehicles, when the vehicle decelerates or brakes.

Additionally, in some preferred configurations of the invention the use of complementary systems that act in conjunction with the previously described system is contemplated, such as the use of a securing system for securing to the accelerator pedal in those implementations on motorized vehicles. In addition, in these same applications, the use of a thermoelectric energy generation system that allows the conversion of thermal energy from exhaust gases or other areas of residual heat from the thermal system into electrical energy is contemplated. In both cases, the coupling of both the connection system for connecting to the accelerator pedal and the thermoelectric power generation system is carried out by means of mechanisms that allow both systems to be coupled in a quick and simple manner, without having to intervene components of the original machinery of the vehicle.

DETAILED DESCRIPTION OF THE INVENTION

Figure 1:
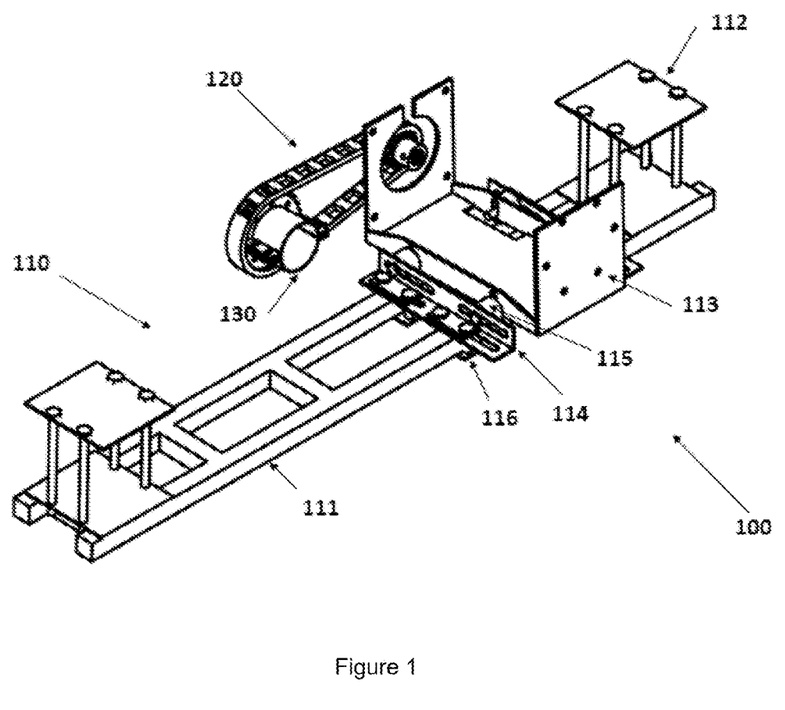
FIG. 1 shows an isometric perspective view of an exemplary configuration of the system for the conversion of mechanisms actuated by internal combustion into a hybrid system.
Figure 2:
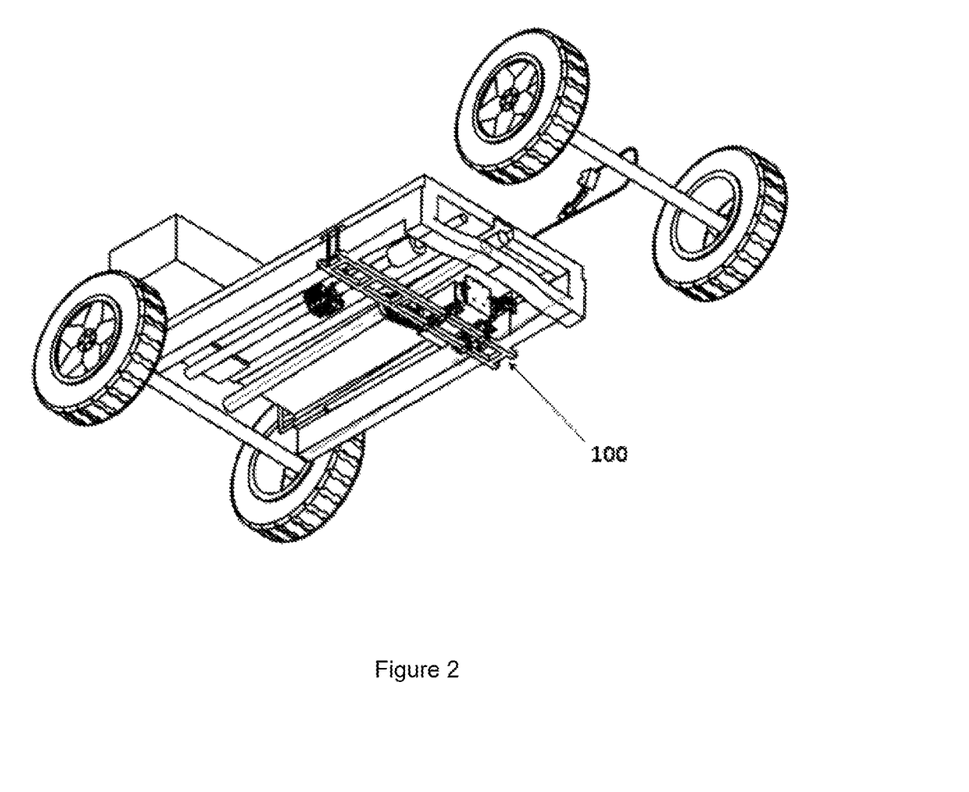
FIG. 2 shows a view of the system of FIG. 1 being coupled to an internal combustion vehicle.
Figure 3A:
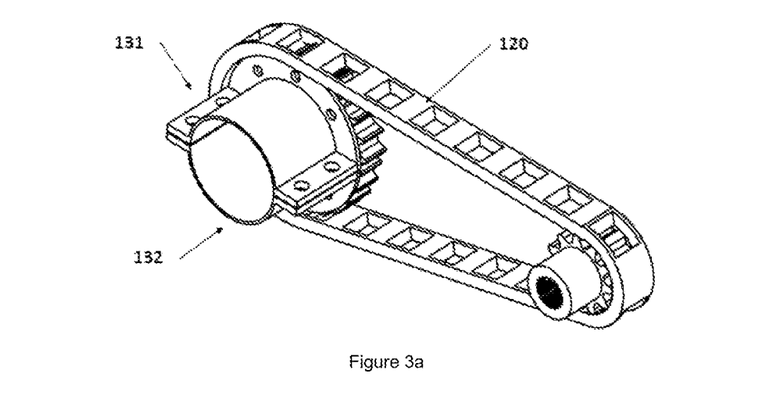
FIGS. 3a and 3b show detailed views of the securing means of the system of FIG. 1.
Figure 3B:
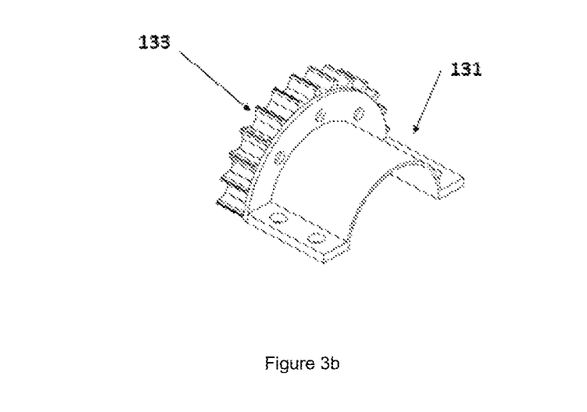

According to the exemplary configuration shown in FIGS. 1 to 3, the present invention consists of a system (100) for the conversion of mechanisms actuated by internal combustion into a hybrid mechanism. The system comprises:

a structure for supporting and positioning an electric motor (110), which comprises means for setting and controlling a position of the electric motor in an area near or adjacent to the transmission shaft of the internal combustion engine;

transmission means (120) that allow power to be transmitted between the electric motor and the transmission shaft of the internal combustion engine; and securing means (130) press-fixed to the transmission shaft of the internal combustion engine, which comprise two high-pressure supports (131, 132) coupled together by attachment means and which encapsulate the transmission shaft at high pressure;

wherein the securing means (130) also comprise a power transmission element (133) attached to the high-pressure supports and which is connected to the transmission means.

In this way, the system (100) can be coupled to a power transmission shaft of any type, such as a universal joint, crankshaft or others, the shaft being able to have a circular, square, cylindrical or conical shape, either of a vehicle, machine or refrigeration system.

As shown more clearly in FIGS. 3a and 3b, the securing means (130) are attached by means of two high-pressure supports (131, 132) to the transmission shaft of the internal combustion engine, such that once both supports are coupled, same cover the entire perimeter of the transmission shaft. Both supports (131, 132) are coupled to the transmission shaft by means of a controlled tightening generated due to the pressure exerted by attachment means, preferably bolts, thus producing a slight elastic deformation in the transmission shaft that generates a force of friction that allows the transmission of power between the transmission shaft and the system (100).

Additionally, the power transmission element (133) is preferably coupled by attachment means, such as bolts, to the high-pressure supports (131, 132), and said power transmission element can take different forms, such as a crown-type element with toothed elements on its outer perimeter, a pulley for power transmission through belts, a chain transmission sprocket or any other element that meets the function of transmitting power appropriately between the transmission shaft and the electric motor.

In this way, as shown more clearly in FIG. 3a, the transmission means (120) are operatively coupled to the transmission element (133), and comprise the use, for example, of pulleys, partitioned pulleys, crown pinion systems, gear systems, chains, or any other type of appropriate mechanism to transmit power between the electric motor and the transmission shaft of the internal combustion engine.

Preferably, the transmission element (133) is made of a metallic material, however, by virtue of the different applications in which the invention can be implemented, the possibility of using other materials, such as plastics or others, is contemplated.

As shown in FIGS. 3a and 3b, preferably the high-pressure supports correspond to two parts with the same characteristics, an upper support (131) and a lower support (132), and are coupled in the form of clamps which, once coupled, encapsulate the transmission shaft, covering its entire perimeter and generating high radial pressure on the transmission shaft. The reason for preferentially using securing means (130) made up of two supports is due to the possibility of carrying out a quick coupling on the transmission shaft, so as to allow a quick and simple assembly and disassembly of the system in general. Preferably, the internal face of both high-pressure supports (131, 132) has a rough surface that causes an increase in the coefficient of friction, which added to the high pressure after the coupling increases the normal radial force of the system, generating a joint between the securing means (130) and the transmission shaft firm enough to transmit a high level of torque without slippage.

The purpose of the structure for supporting and positioning the electric motor (110) is to be the bearing structure of the electric motor and to absorb the stresses associated with the energy transfer between the electric motor and the transmission shaft, either in a power transmission configuration or in a regenerative configuration.

As can be seen in FIG. 1, the structure for supporting and positioning the electric motor (110) comprises a lower support of the structure (111), made up of a transversal structure that allows the position of the electric motor to be set and positioned in an area near or adjacent to the transmission shaft. The lower support of the structure (111) has the objective of supporting torsion, bending and other loads that are produced by the effect of the transmission of mechanical power from the motor to the shaft and from the shaft to the motor, and is made up of one or more metal parts, such as steel or other solid material. In preferred configurations of the invention, this support (111) is made up of bars joined together by means of welds or bolted joints and is lattice-shaped to increase its inertia.

The lower support of the structure (111) is joined to attachment means for attaching the structure (112), which allow the attachment of the structure (110) with respect to the internal combustion mechanism, to which the system (100) is coupled. For example, in the event that the system (100) is used in a vehicle, said attachment means for attaching the structure (112) are attached to the vehicle chassis, as shown for example in FIG. 2, by means of respective fastening means, such as bolts, which exert the required force to keep the system (100) in position. In addition, in the event that the system is coupled to other types of machines, it is coupled to the chassis of the structure in an equivalent manner, with small variations according to the specific requirements of the machine.

The attachment means of the structure (112) are positioned at both ends of the lower support of the structure (111) and allow the lower support (111) to be joined, in a non-invasive manner, to the internal combustion mechanism, for example, the chassis of a vehicle, a machine or any system where the invention is going to be implemented.

In preferred configurations of the invention, for example in those applications in which the system is coupled to an internal combustion vehicle, the attachment means of the structure (112) comprise a lower metal surface and an upper metal surface, both in the form of plates, which are arranged spaced apart from each other on the vertical axis and wherein the upper plate is attached to the vehicle chassis, while the upper plate is attached to the lower support of the structure (111), as shown in FIGS. 1 and 2.

On the lower support of the structure (111) there is a housing for the electric motor (113), which preferably comprises a frame or casing for the electric motor or generator, and has the objective of protecting the system from impacts during operation. In preferred configurations of the invention, the housing of the electric motor (113) is coupled on each side to respective lateral supports (114), which in turn are attached on the lower support of the structure (111) by means of respective attachment means (116). However, in alternative configurations of the invention, the housing of the electric motor (113) can be coupled directly on the lower support of the structure (111) by means of respective attachment means.

In this way, the position of the electric motor is preferably controlled by positioning and attaching the respective lateral supports (114), such that it is possible to set a distance of the electric motor with respect to the transmission shaft according to different operating or design criteria, depending on each application. This configuration allows the position of the motor to be controlled, for example, in order to tension the transmission means (120), whether in the form of a chain, belt or any type of transmission. In addition, this configuration allows the housing of the electric motor (113) to be arranged in any orientation and distance with respect to the transmission axis.

In preferred configurations of the invention, the joint between the housing of the electric motor (113) and the respective lateral supports (114) is carried out with the help of vibration isolation means (115), the purpose of which is to absorb vibrations typical of the system's operation, allowing to reduce unwanted efforts and wear. The vibration isolation means (115) comprise the use of flexible or resilient materials, such as the use of high-density polymers or plastics.

Figure 4:
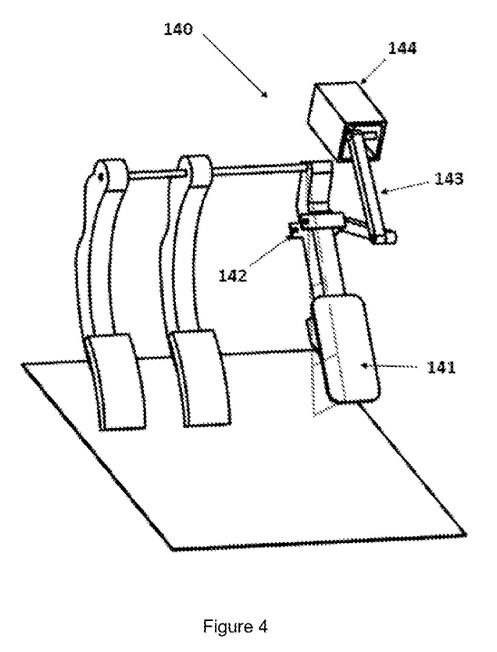
FIG. 4 shows an isometric perspective view of a securing system for securing to the accelerator pedal in an internal combustion vehicle.

According to FIG. 4, in those configurations in which the invention is implemented in an internal combustion vehicle, the system (100) also comprises a securing system for securing to the accelerator pedal (140), the purpose of which is to be able to use the accelerator pedal of any vehicle to include an electronic accelerator, that is, by actuating the accelerator pedal of the vehicle the system allows two accelerators to be activated, one for the internal combustion engine of the vehicle and another for the electric motor. The securing system for securing to the accelerator pedal (140) is made up of accelerator securing means (142) press-fixed to the accelerator pedal (141), wherein said accelerator securing means (142) are coupled by means of pivot joints to a system of bars (143) that allow the movement of the accelerator pedal (141) to be transmitted to an electronic controller (144), which allows said movement to be converted into an electrical signal that is processed by the system (100) in order to control the acceleration of the electric motor.

The system of bars (143) can be made up of two or more bars joined in a pivoting manner, which can be made of a metallic material or other materials with sufficient rigidity to transmit the actuation of the accelerator pedal. In addition, in alternative configurations of the invention, the securing system for securing to the accelerator pedal (140) could be made up of other types of mechanisms to transmit the movement of the accelerator pedal (141) to an electronic controller (144), such as, through the use of a single bar that joins both elements, or combinations of bars and springs, or others.

Figure 5:
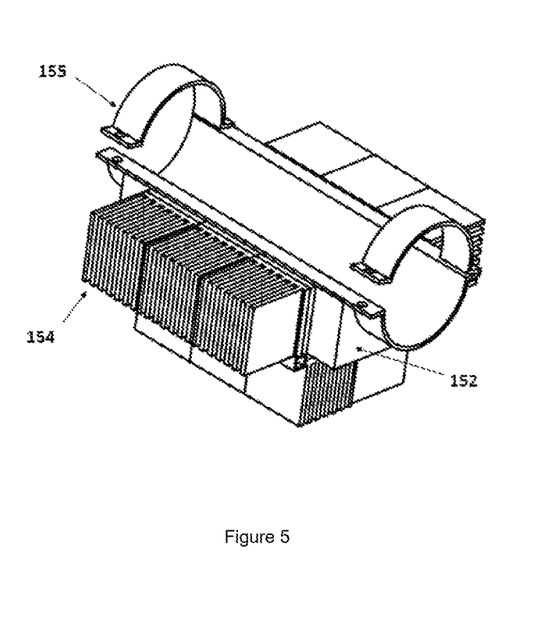
FIG. 5 shows an isometric perspective view of a thermoelectric generation system in an internal combustion vehicle.

Referring to FIG. 5, in preferred configurations of the invention, the system (100) can also include the use of a thermoelectric energy generation system (150) that allows energy from the exhaust gases of a vehicle to be used in the form of heat, in order to supply electrical energy to the system (100). The thermoelectric energy generation system (150) is preferably coupled to the exhaust gas pipe of a vehicle by means of respective attachment means (155), and also comprises heat transfer means (152) that are arranged in direct contact with the pipe, in order to allow heat transfer by means of conduction. Preferably, the heat transfer means (152) are arranged partially or completely covering the perimeter of the pipe so as to optimize heat recovery.

The heat transfer means (152) preferably comprise a plurality of thermoelectric cells (not shown in the figures), based on the Peltier-Seebeck effect, which allow heat energy to be converted into electrical energy that is subsequently stored in an energy storage system. Thermoelectric cells can be arranged in different arrangements and configurations, varying in number and arrangement, in series or in parallel, depending on design and operation criteria.

In this way, one of the faces of the thermoelectric cells is placed in contact with the heat transfer means (152), while heat dissipation means (154) are arranged on the opposite face of the cells, which allows a temperature difference to be generated between the two faces. This temperature difference produces a voltage difference that then induces an electric current that is used by the system (100).

As will be apparent to a person skilled in the art, the invention contemplates the use of additional systems that are relevant to achieving the operation of the hybrid system, such as energy storage systems, a control system, and electrical connection means. Energy storage systems can include the use of a battery bank or other types of technologies, such as hydrogen cells. In addition, through the selective use of the different components of the system (100) it is possible to achieve different modes of operation, which are detailed below.

Figure 6:
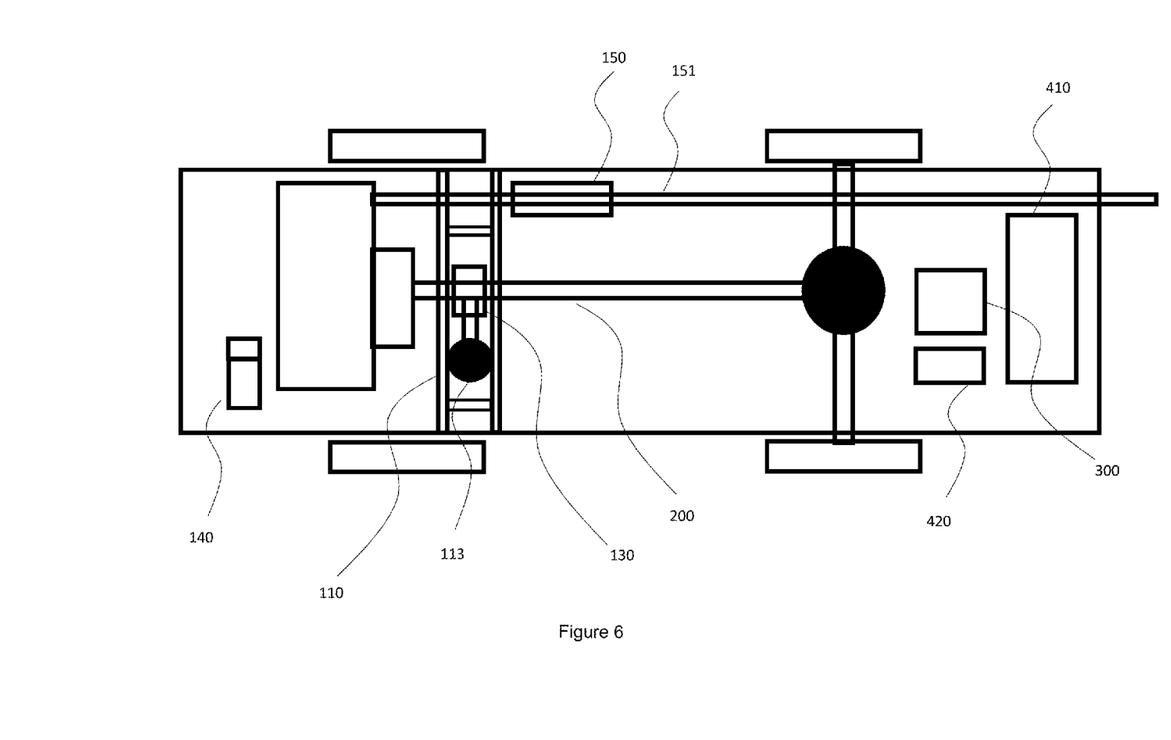
FIG. 6 shows a schematic view of the different components of the system of FIG. 1 during an implementation in a power transmission mode.

According to FIG. 6, the system (100) can be implemented in a power transmission mode. In this configuration, the system (100) is implemented in this case in the lower portion of an internal combustion vehicle, such that the structure for supporting and positioning the electric motor (110) is attached to the vehicle chassis, thus allowing the position of the electric motor to be set by positioning the housing of the electric motor (113), in an area adjacent to the transmission shaft of the internal combustion engine. The securing means (130) are arranged so as to attach the transmission shaft of the internal combustion engine (200) at high pressure.

The electric motor is electrically connected to control means (300), which are responsible for receiving alert signals from the system (100) and the signals from the securing system for securing to the accelerator pedal (140), to control the operation of the system (100) and its different components. The control means (300) are operatively communicated with first energy storage means (410), which are also coupled to the chassis of the vehicle, and which make it possible to store the electrical energy required for the operation of the system (100) and particularly for the operation of the electric motor. In addition, the system can optionally include the use of the thermoelectric energy generation system (150), which is coupled to the exhaust gas pipe of the vehicle. Said system (150) is operatively communicated with second energy storage means (420) that accumulate the energy generated by the thermoelectric generation system (150), and which in turn are operatively communicated with the control means (300).

Figure 7:
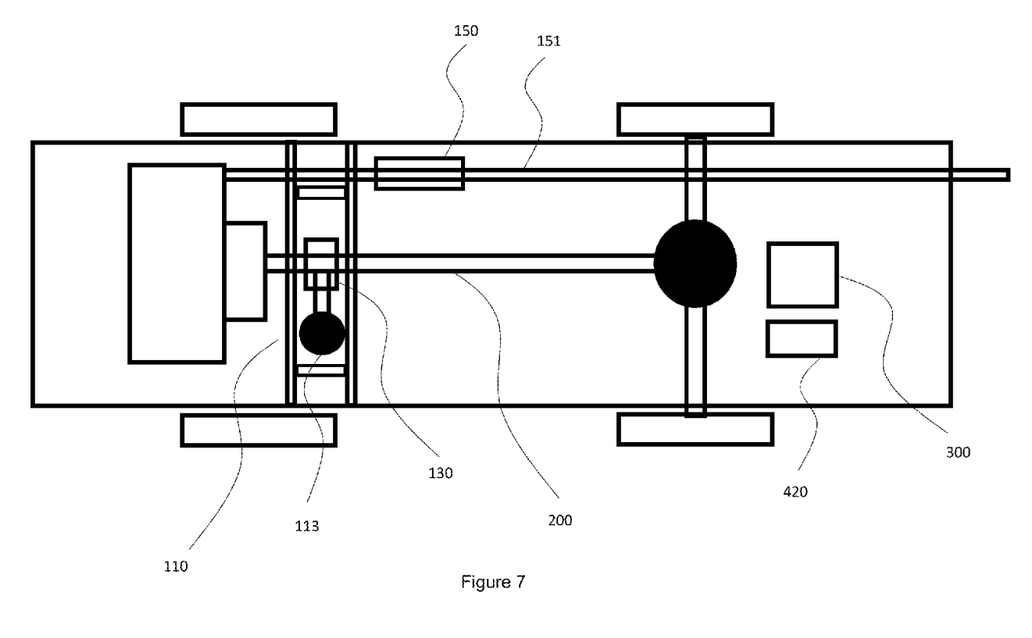
FIG. 7 shows a schematic view of the various components of the system of FIG. 1 during an implementation in a regeneration mode.

According to FIG. 7, the system (100) can be further implemented in a regenerative mode. In this configuration, the system (100) includes several of the essential components used in the power transmission mode, with the fundamental difference that in this configuration the electric motor operates as an electric energy generator. In particular, the system (100) is also implemented in the lower portion of an internal combustion vehicle, such that the structure for supporting and positioning the electric motor (110) is attached to the vehicle chassis, thus allowing the position of the generator to be set by positioning the housing of the electric motor (113), in an area adjacent to the transmission shaft of the internal combustion engine. The securing means (130) are arranged so as to attach the transmission shaft of the internal combustion engine (200) at high pressure.

The generator is operatively connected to the control means (300), which is responsible for controlling the operation of the system (100) and its different components. The control means (300) are operatively communicated with the second energy storage means (420), which are also coupled to the vehicle chassis, and allow the electrical energy generated by the system (100) to be stored. In this configuration, the electrical energy generated refers substantially to the conversion of mechanical to electrical energy carried out by the generator, however, the system can optionally include the use of the thermoelectric energy generation system (150), which is operatively communicated with the second energy storage means (420).

Additionally, the present invention contemplates a method for the conversion of a mechanism actuated by means of internal combustion into a hybrid system, which will be described with reference to FIGS. 6 and 7, which comprises the following steps:

a) positioning the structure for supporting and positioning the electric motor (110) using around 50% of the torque capacity on each of the attachment means, the positioning and setting including the housing of the electric motor (113) in an area near or adjacent to the transmission shaft (200) of the internal combustion engine;

b) positioning the securing means (130) on the transmission shaft (200) of the internal combustion engine, and press-fixing the two high-pressure supports (131, 132) on the transmission shaft (200);

c) once the components of the support structure (110), the transmission means (120) and the securing means (130) are positioned, aligning each of the components and gradually increasing the torque to around 100% of the capacity on each of the attachment means;

d) locating and setting the energy storage means (410, 420) and the control means (300);

e) locating and setting electrical connection means that allow each of the components of the system (100) to be operatively communicated.

In this way, the previously described conversion method allows the positioning, setting and connection of the components of the system in a non-invasive manner, and in a quick and simple manner.

In order to increase the coefficient of friction between the transmission shaft (200) and the securing means (130), during the step of positioning and attaching the securing means (130), the additional step of depositing abrasive material on the contact surface between the transmission shaft and the securing means is included, after which pressure is exerted between both supports (131, 132) until a normal force is obtained that causes both faces to be under the required pressure so that there is no slippage between the components.

In addition, during steps a) and b), of positioning the support structure (110) and the securing means (130), the system is at 50% of its torque level, so that the different components are in a partially movable state. During these steps, the method contemplates the possibility of using alignment systems, such as laser and/or mechanical systems, for the alignment of the transmission system (120), and thus increase the efficiency of the system. Once the optimum alignment is obtained, the torque on the attachment means is gradually increased and it is verified that the alignment is maintained within the required tolerances.

During step d), of locating and setting the energy storage means (410, 420) and the control means (300), the possibility of carrying out the respective calculations to establish the optimum place for positioning the components is also included, so as to affect the center of mass of the complete system as little as possible, preferably seeking to modify the center of mass of the system by up to 5%.

In optional configurations of the invention, the method includes the step of coupling and connecting the securing system for securing to the accelerator pedal (140), which contemplates attaching the accelerator securing means (142), the system of bars (143) and the electronic controller (144) to the accelerator pedal, such that the actuation of the accelerator pedal is operatively communicated to the system (100).

Additionally, the method can also contemplate a previous step of sizing the system (100), in which the technical capabilities of the power system of the internal combustion mechanism (whether in the form of a vehicle, machine or a system of refrigeration) are analyzed, and in which the percentage that the electric system will contribute during the operation is defined. From this previous analysis, the sizing of the components of the system (100) is carried out.

The method for the conversion of an internal combustion mechanism into a hybrid system can also contemplate a final step of carrying out functional tests, wherein once all the components of the system are connected, tests are carried out to measure the performance of the system. This step allows the possibility of detecting anomalies such as vibrations, temperature variations, heat sources, noise, voltage level, electrical system error codes, among others. In the event that it is established that the entire system is operating within pre-established ranges, the method is terminated.

Finally, it should be noted that various aspects of the invention, such as dimensions, choice of materials, and specific aspects of the preferred configurations described above, may vary or be modified based on specific operational requirements. Accordingly, the description of the specific configurations described above is not intended to be limiting, said variations and/or modifications being within the spirit and scope of the invention.

The invention claimed is:

1. A system (100) for converting a mechanism actuated by internal combustion into a hybrid mechanism, CHARACTERISED in that it comprises:
a structure for supporting and positioning an electric motor (110), which comprises means for setting and controlling a position of the electric motor in an area near or adjacent to the transmission shaft of an internal combustion engine;
transmission means (120) that allow power to be transmitted between the electric motor and the transmission shaft of the internal combustion engine; and
securing means (130) press-fixed to the transmission shaft of the internal combustion engine, which comprise two high-pressure supports (131, 132) coupled together by attachment means and which encapsulate the transmission shaft at high pressure;
wherein the securing means (130) also comprise a power transmission element (133) attached to the high-pressure supports and which is connected to the transmission means.

2. The system according to claim 1, CHARACTERISED in that once the securing means (130) are coupled, the same cover the entire perimeter of the transmission shaft.

3. The system according to claim 2, CHARACTERISED in that the supports (131, 132) are coupled to the transmission shaft by means of a controlled tightening by attachment means, producing a slight elastic deformation in the transmission shaft that generates a force of friction that allows power to be transmitted.

4. The system according to claim 3, CHARACTERISED in that the high-pressure supports correspond to two parts with the same characteristics, an upper support (131) and a lower support (132), and are coupled to the transmission shaft in the form of clamps.

5. The system according to claim 1, CHARACTERISED in that the power transmission element (133) is coupled by attachment means to the high-pressure supports (131, 132).

6. The system according to claim 1, CHARACTERISED in that the transmission means (120) are selected from a group consisting of: pulleys, partitioned pulleys, crown pinion systems, gear systems, and chains.

7. The system according to claim 1, CHARACTERISED in that the structure for supporting and positioning the electric motor (110) comprises a lower support of the structure (111), made up of a transversal structure that the position of the electric motor to be set and positioned in an area near or adjacent to the transmission shaft.

8. The system according to claim 7, CHARACTERISED in that the lower support of the structure (111) is made up of bars joined together by means of welds or bolted joints and is lattice-shaped.

9. The system according to claim 7, CHARACTERISED in that the lower support of the structure (111) is joined to attachment means of the structure (112), which allow the structure (110) to be attached with respect to the internal combustion mechanism.

10. The system according to claim 9, CHARACTERISED in that the attachment means of the structure (112) are positioned at both ends of the lower support of the structure (111).

11. The system according to claim 10, CHARACTERISED in that the attachment means of the structure (112) comprise a lower metal surface and an upper metal surface, both in the form of plates, which are arranged spaced apart from each other on the vertical axis and wherein one of the plates is attached to the internal combustion mechanism, while the other plate is attached to the lower support of the structure (111).

12. The system according to claim 1, CHARACTERISED in that a housing of the electric motor (113) which comprises a frame or casing is arranged on the lower support of the structure (111).

13. The system according to claim 12, CHARACTERISED in that the housing of the electric motor (113) is coupled on each side to respective lateral supports (114), which are attached on the lower support of the structure (111) by attachment means (116).

14. The system according to claim 13, CHARACTERISED in that between the housing of the electric motor (113) and the respective lateral supports (114), vibration isolation means (115) are arranged, which allow vibrations typical of the system's operation to be absorbed.

15. The system according to claim 14, CHARACTERISED in that the vibration isolation means (115) comprise flexible or resilient materials of high-density polymers or plastics.

16. The system according to claim 1, CHARACTERISED in that the system (100) also comprises a securing system for securing to the accelerator pedal (140), which allows the accelerator pedal of a vehicle to be used to include an electronic accelerator that communicates with the system (100).

17. The system according to claim 16, CHARACTERISED in that the securing system for securing to the accelerator pedal (140) is made up of accelerator securing means (142) press-fixed to the accelerator pedal (141), wherein the accelerator securing means (142) are coupled by means of pivot joints to a system of bars (143) that transmit the movement of the accelerator pedal (141) to an electronic controller (144), which communicates electronically with the system (100).

18. The system according to claim 1, CHARACTERISED in that it also comprises a thermoelectric energy generation system (150) which uses energy in the form of heat from vehicle exhaust gases and supplies electrical energy to the system (100).

19. The system according to claim 18, CHARACTERISED in that the thermoelectric energy generation system (150) is coupled to the exhaust gas pipe by attachment means (155), and also comprises heat transfer means (152) that are arranged in direct contact with the pipe, partially or completely covering the perimeter of the pipe.

20. The system according to claim 19, CHARACTERISED in that the heat transfer means (152) comprise a plurality of thermoelectric cells based on the Peltier-Seebeck effect.

21. The system according to claim 20, CHARACTERISED in that one of the faces of the thermoelectric cells is arranged in contact with the heat transfer means (152), while heat dissipation means (154) are arranged on the opposite face of the cells.

22. The system according to claim 1, CHARACTERISED in that it also comprises energy storage systems, a control system and electrical connection means, wherein the energy storage systems include the use of a battery bank, hydrogen cells or others.

23. The system according to claim 1, CHARACTERISED in that it can operate in a power transmission mode or in a regenerative mode.

24. The system according to claim 23, CHARACTERISED in that in the power transmission mode, the electric motor is electrically connected to control means (300), which receive signals from the system (100) and from the securing system for securing to the accelerator pedal (140), and which communicates with first energy storage means (410) which store the electrical energy required for the operation of the electric motor.

25. The system according to claim 24, CHARACTERISED in that it also comprises a thermoelectric energy generation system (150) coupled to the exhaust pipe of a vehicle and communicated with the control means (300), which is connected to second energy storage means (420) that accumulate the energy generated by the thermoelectric generation system (150).

26. The system according to claim 23, CHARACTERISED in that in the regenerative mode the electric motor operates as an electric energy generator, wherein said generator is operatively communicated with control means (300) that are connected to second energy storage means (420), which store the electrical energy generated by the generator.

27. The system according to claim 26, CHARACTERISED in that it also comprises a thermoelectric energy generation system (150), which is operatively communicated with the second energy storage means (420).

28. A method for converting a mechanism actuated by internal combustion into a hybrid system, which comprises the use of the system (100) of claim 1, and is CHARACTERISED in that it comprises the steps of:
 a) positioning the structure for supporting and positioning the electric motor (110), the positioning and setting including the housing of the electric motor (113) in an area near or adjacent to the transmission shaft (200) of the internal combustion engine;
 b) positioning the securing means (130) on the transmission shaft of the internal combustion engine, and press-fixing the two high-pressure supports (131, 132) on the transmission shaft;
 c) once the components of the support structure (110), the transmission means (120) and the securing means (130) are positioned, aligning each of the components;
 d) locating and setting the energy storage means (410, 420) and the control means (300);
 e) locating and setting electrical connection means that allow each of the components of the system (100) to be operatively communicated.

29. The method according to claim 28, CHARACTERISED in that it comprises the step of positioning and attaching the securing means (130), including depositing abrasive material on the contact surface between the transmission shaft and the securing means, and subsequently exerting pressure between both supports (131, 132) until a normal force is obtained that causes both faces to be under the required pressure so that there is no slippage between the components.

30. The method according to claim 28, CHARACTERISED in that in the steps of positioning the support structure (110) and the securing means (130), the system is at 50% of its torque level, so that the various components are in a partially movable state.

31. The method according to claim 30, CHARACTERISED in that it also comprises the step of using alignment systems for the alignment of the transmission system (120), and subsequently, gradually increasing the torque in the attachment means until the final attachment of the components has been done.

32. The method according to claim 30, CHARACTERISED in that the steps of locating and setting the energy storage means (410, 420) and the control means (300), the step of calculating the optimal positioning location of the components is included, so as to affect the center of mass of the complete system as little as possible.

33. The method according to claim 28, CHARACTERISED in that it also comprises coupling and connecting the securing system for securing to the accelerator pedal (140), by means of attaching the accelerator securing means (142), the system of bars (143) and the electronic controller (144)

to the accelerator pedal, and operatively communicating the actuation of the accelerator pedal to the system (100).

34. The method according to claim 28, CHARACTERISED in that it comprises a prior step of sizing the system (100), wherein the technical capabilities of the power system of the internal combustion mechanism are analyzed and wherein the percentage that the electric system will contribute during operation is defined, based on which the components of the system (100) are sized.

35. The method according to claim 28, CHARACTERISED in that once the preceding steps have been completed, a step of carrying out functional tests is carried out, wherein once all the components of the system are connected, tests are carried out to measure the performance of the system.

\* \* \* \* \*